United States Patent
Bronstein

[15] 3,677,562
[45] July 18, 1972

[54] PICK-UP LOAD HOLDER

[72] Inventor: Benjamin Bronstein, McLure, British Columbia, Canada

[22] Filed: Dec. 14, 1970

[21] Appl. No.: 97,642

[30] Foreign Application Priority Data

Sept. 1, 1970 Canada....................................092085

[52] U.S. Cl. ..........................................280/179 A, 296/43
[51] Int. Cl.........................................................B60p 7/12
[58] Field of Search......................280/179 R, 179 A, 179 B; 105/369 A, 369 B; 296/43

[56] References Cited

UNITED STATES PATENTS

| | | | |
|---|---|---|---|
| 3,595,452 | 7/1971 | Anderson | 296/43 X |
| 2,993,708 | 7/1961 | Holman | 280/179 B |
| 601,370 | 3/1898 | Cohalan | 280/179 A X |
| 2,539,997 | 1/1951 | Graves | 280/179 A X |
| 2,973,934 | 3/1961 | Foster | 280/179 B X |
| 1,703,495 | 2/1929 | MacChesney et al. | 105/369 A |
| 3,572,755 | 3/1971 | Baldwin | 250/179 R |
| 3,365,230 | 1/1968 | Langdon | 296/43 X |

Primary Examiner—Leo Friaglia
Attorney—Weir, Marshall, MacRae & Lamb

[57] ABSTRACT

In a load carrying vehicle such as a pick-up truck, a cross-beam spans the load carrying area and is connected at each end thereof to a vertical stake mounted in a stake pocket which is normally part of the vehicle body. The load can be secured against the cross-beam with a load retainer, such as a chain and cinch mechanism, the ends of which are firmly attached to the stakes.

1 Claim, 2 Drawing Figures

Patented July 18, 1972  3,677,562
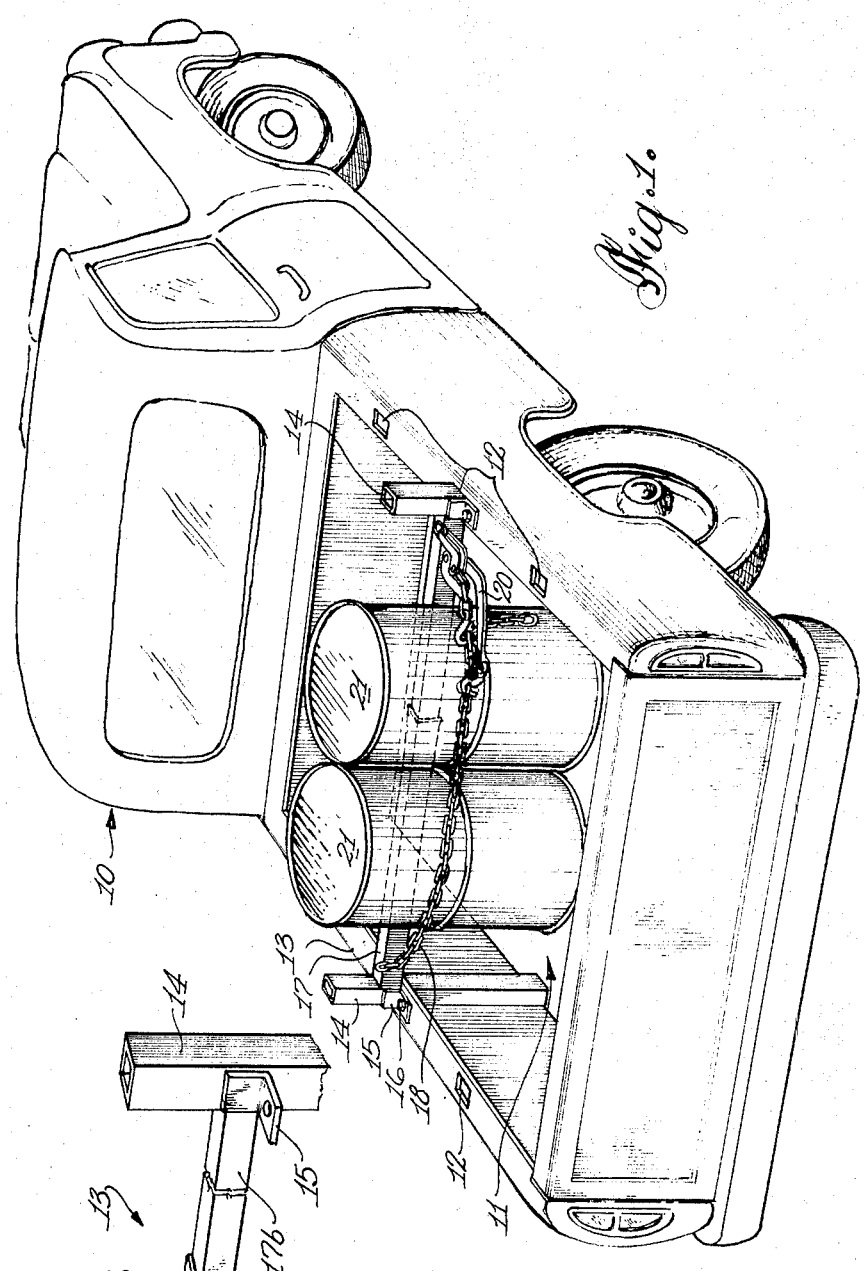
Fig. 1.
Fig. 2.
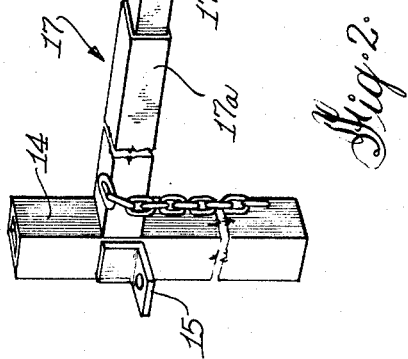
INVENTOR:-
Benjamin Bronstein
By:
Weir, Marshall,
MacRae & Lamb
PATENT AGENTS

PICK-UP LOAD HOLDER

This invention relates to a load holder for a load-carrying vehicle and more particularly to a load holder for a pick-up truck.

Pick-up trucks comprise a high percentage of the utility vehicles in use today. There are many accessories available for converting or enhancing the load-carrying area, or box, of these trucks, ranging from the recreational camper-type additions to a full set of stakes. However, when it comes to carrying small or diverse cargoes, especially in small quantities, the user of a pick-up truck is faced with the problem of securing the load against movement. Often the load is tied with ropes to whatever part of the body is accessible. This is definitely unsafe and an accident resulting from a shifting load could have serious consequences.

Large bulky items, such as fuel drums, are usually carried in small quantities, and only occassionally, by most operators of pick-up trucks. The operator of such a truck cannot afford to build unique load holders for each type and size of cargo he carries.

It is therefore an object of this invention to provide a load holder for a pick-up truck to secure small and diverse loads against movement.

It is further object of this invention to provide a load holder for a pick-up truck which is readily adaptable to secure loads of practically any reasonable size.

It is another object of this invention to provide a load holder for a pick-up truck which may be used in trucks having a non-uniform bed width.

The present invention fulfils these objects by providing a load holder to be used in load-carrying vehicles which have stake pockets spaced along opposite sides of the load-carrying area. The load holder includes vertical stakes for reception in these stake pockets, on opposite sides of the load-carrying area, a cross-beam for traversing the load-carrying area, means for connecting the cross-beam at each end thereof to the vertical stakes, and a load-retaining means which secures the load against the cross-beam to prevent movement of the load relative to the cross-beam. With the load holder mounted on the vehicle body, a load is located so that it rests against the cross-beam. The load-retaining means is then tightened around the load, holding it in place.

The invention will now be described in greater detail, and with reference to the drawings, wherein:

FIG. 1 is a perspective view showing the invention as applied to a pick-up truck.

FIG. 2 is an enlarged perspective view showing one embodiment of the invention.

Referring to FIG. 1, a load-carrying vehicle 10, in this instance, a pick-up truck, is provided with a load-carrying area 11. Standard stake pockets 12 are located at spaced intervals along opposite sides of the load-carrying area.

A load holder, generally referred to by 13, is provided such that it can be attached to the vehicle to prevent movement of a load carried in the vehicle's load-carrying area. The load holder 13 includes vertical stakes 14 which are of a size to fit snugly in stake pockets 12. Preferably the stakes 14 are constructed from steel tubing of rectangular cross-section, but any material of any cross-section may be used to accommodate different vehicular configurations. A cross-beam 17 is provided for spanning or traversing the load-carrying area. In the preferred embodiment shown here, the vertical stakes 14 are aligned directly opposite each other in the appropriate stake pockets. The cross-beam 17 is generally horizontal and is connected at each end thereof to one of the stakes 14. Any known means of connection, such as welding or rivetting, may be used if the connection is to be permanent. If the load holder is to be collapsible; if the height of the cross-beam relative to the load-carrying area is to be altered; or if more than one cross-beam is required, then multiple connection points, such as collars for slidably receiving an end of each cross-beam, may be provided along the length of each stake. In addition, extra height may be obtained if the stakes 14 are constructed so that they are each telescopic. In a preferred embodiment, the cross-beam 17 is constructed of at least two members 17a and 17b as shown in FIG. 2, such that one is slidably received in the other, to make the cross-beam 17 telescopic. With this feature, the load holder can be used with load-carrying areas of various widths.

A load retaining means 18 is provided to secure a load against the cross-beam 17 and to thereby prevent movement of the load relative to the cross-beam.

The load retaining means is essentially an elongated flexible member and could be a hinged gate mechanism or even a simple rope. In a preferred embodiment, the load retaining means comprises a chain 19 and a cinch mechanism 20. The chain 19 is attached at one end thereof to the cross-beam. The method of attachment may be by welding or other known means, for example by hooks spaced along the cross-beam. The cinch mechanism 20, which may be of the well-known over-center latching variety, as shown, is also attached at one end thereof to the cross-beam, and at the other end to the chain 19. When the cinch mechanism is properly actuated, the chain is drawn tight around the load, such as fuel drums 21, forcing the load against the cross-beam. Alternative arrangements for the chain-cinch combination are possible, such as having the cinch mechanism located in the center of the chain, which is attached at each end to the cross-beam, or having the chain wrap completely around the load with the cinch mechanism either in the center or at the end. In either case of the latter alternative, the second attachment points to the cross-beam may be coincident with the first. This alternative would usually be used when a load is carried on each side of the cross-beam.

The load holder 13 may be firmly attached to the vehicle via angle brackets 15 and bolts 16. It is preferable to attach the load holder to the vehicle so that vibration and subsequent shifting of the load is kept to a minimum. The angle brackets 15 are, of course, firmly attached to the vertical stakes. 14.

I claim:

1. A load holding device for load-carrying vehicles having a load-carrying area and stake pockets spaced along opposite sides of said load-carrying area, including vertical stakes for reception on opposite sides of said load-carrying area in said stake pockets, at least one cross-beam for traversing said load-carrying area, connecting means for connecting said cross-beam at each end thereof to said vertical stakes, load-retaining means for securing a load against said cross-beam to restrict movement of said load relative to said cross-beam and spaced attachment means on said cross-beam for attaching said load-retaining means to said cross-beam.

* * * * *